March 23, 1954
S. H. FILLION
2,673,085
TOWING SNUBBER
Filed Oct. 10, 1950
2 Sheets-Sheet 1
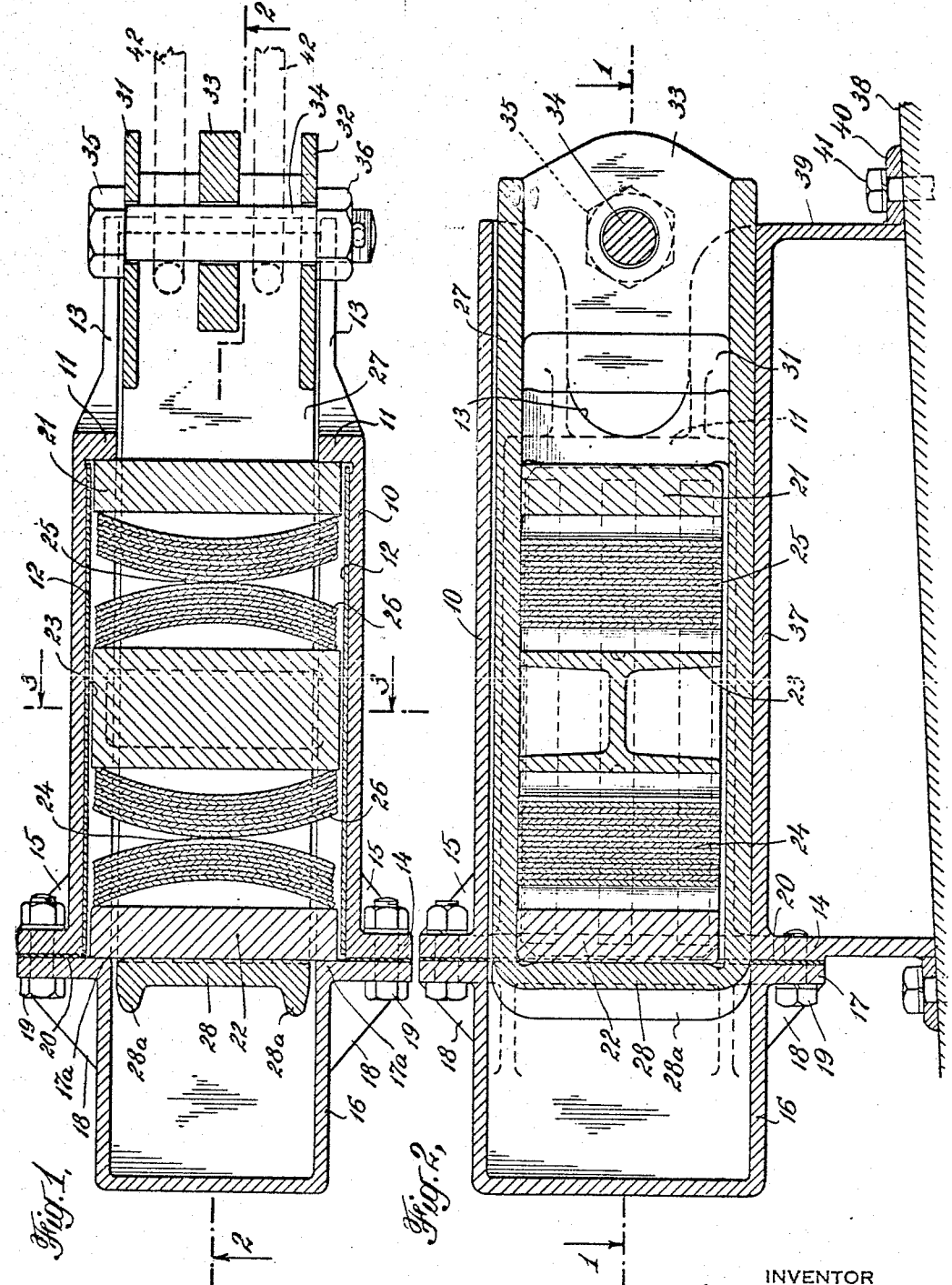
INVENTOR
Stanley H. Fillion
BY
Pennie, Edmonds, Morton & Barrows
ATTORNEYS

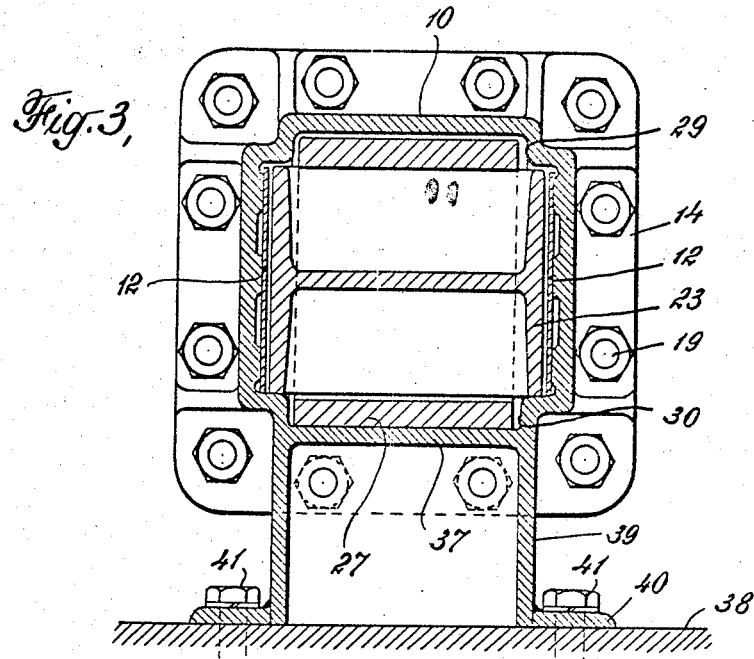
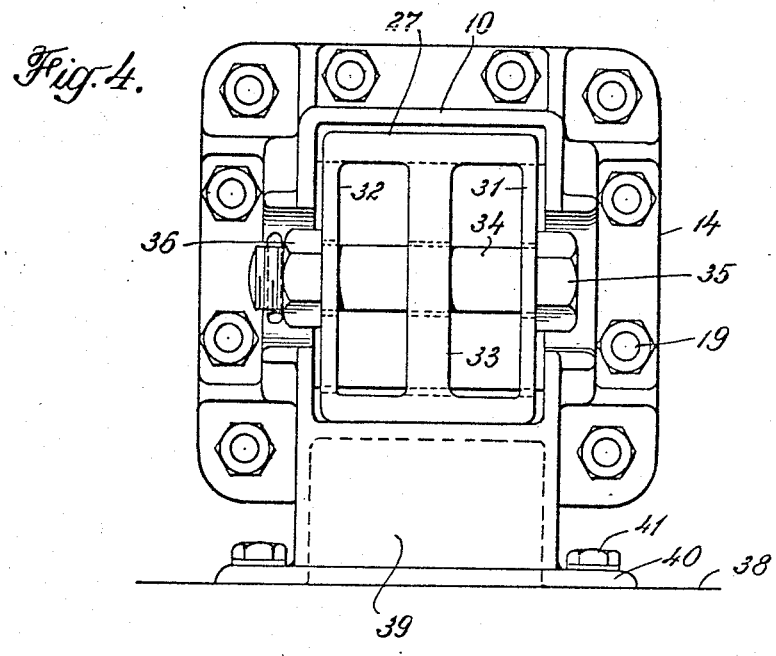

Patented Mar. 23, 1954

2,673,085

UNITED STATES PATENT OFFICE 2,673,085

TOWING SNUBBER

Stanley H. Fillion, Scarsdale, N. Y., assignor to Waugh Equipment Company, New York, N. Y., a corporation of Maine Application October 10, 1950, Serial No. 189,352

7 Claims. (Cl. 267—70)

This invention relates to devices used on vessels as a means for securing cables thereto, and is concerned more particularly with a novel snubber for that purpose, which is especially adapted for use on barges, tugs, and tow boats connected by cables to form a tow.

At the present time, tows traveling on inland waterways and in coastal waters comprise, in one form, a plurality of barges tied by cables tightly end to end and in one or more rows, and the motive power is a tug, which lies at one side of the row of barges or between the rows and is tightly connected to the barges. In another form of tow, the barges are tied tightly end to end in rows, barges in adjacent rows are tightly connected together, and the tow boat is tightly connected to a stern barge. The tight connections referred to are made by cables, frequently of wire, which are attached to rigid parts of the vessel structures and then made taut by devices called ratchets, so that the cables are under an initial load, which may be as much as 40,000 lbs. In service, the taut cables are occasionally subjected to additional loads, because of rough water, etc., and, since the parts of the vessels, to which the cables are secured are unyielding, breakage of the cables results.

The present invention is directed to the provision of a snubber serving as a means for securing a cable to a vessel and so constructed that it is rigid and unyielding under the loads normally applied to the cable to make a tight connection between two vessels. Under excessive loads, the active portion of the snubber shortens in length, so as to relieve the strain on the cable and prevent its breaking, and, when the excessive load is removed, the active portion of the snubber resumes its original condition. The snubber is of simple, rugged construction and made of a relatively few parts, which are easily assembled. It is adapted for attachment to a rigid part of the vessel structure and is small and compact, so that it occupies little space and is not subject to damage.

For a better understanding of the invention, reference may be made to the accompanying drawings in which:

Fig. 1 is a view of one form of the snubber member in horizontal section on the line 1—1 of Fig. 2;

Figs. 2 and 3 are sectional views on the lines 2—2 and 3—3, respectively, of Fig. 1, and Fig. 4 is a front end view of the snubber.

The snubber illustrated in the drawing comprises a housing 10, which is preferably rectangular in section and is open at both ends and, inwardly from its front end, the housing is provided with flanges 11 extending inwardly from its opposite side walls and serving as stops. Liner plates 12, to take wear, are mounted against the inner surfaces of the side walls and extend from stops 11 to the other end of the casing. At its front end beyond stops 11, the side walls of the housing are slotted, as indicated at 13.

At its rear end, the housing is provided with a continuous flange 14 extending outwardly from the top, sides, and bottom of the housing and the flange is stiffened by ribs 15. The rear end of the housing is closed by a cap 16, which is rectangular in section and provided with a continuous lateral flange 17 stiffened by ribs 18. The cap is connected to the housing by bolts 19 passing through the flanges and through a gasket 20 interposed between the flanges. The internal width of the cap is approximately the same as the distance between the opposed ends of stops 11, so that portions of flanges 17 of the cap serve as stops 17a at the rear end of the housing.

A front end follower 21 is mounted within the housing to bear against the inner faces of stops 11 and a rear end follower 22 lies within the housing against the rear stops 17a. A center follower 23 lies within the housing mid-way between the end followers and similar spring groups 24, 25 lie in each space defined by an end follower and the center follower. Each spring group preferably comprises a pair of sets of curved leaf springs 26, the springs of the two sets in a group lying with their convex surfaces in engagement and the outer spring in each set bearing at its ends against a follower.

The assembly of followers and spring groups within the housing is encircled by a yoke 27, the rear end 28 of which is stiffened by ribs 28a. The longitudinal members of the yoke are narrower than the distance between the side walls of the cap and the opposed ends of stops 11, and the top and bottom of the housing is formed with channels 29, 30 receiving the longitudinal members of the yoke and guiding the yoke in its movements. The yoke projects out of the housing, when the rear end of the yoke is in contact with the rear follower 22, and the projecting ends of the longitudinal members of the yoke are connected by outer plates 31, 32 and a central plate 33, which may be welded in place. A bolt 34 extends through aligned openings in the plates and the head 35 at one end of the bolt and the nut 36 at the other lie in the slots 13 of the housing, so that the yoke with the bolt in place may move freely in the housing.

The bottom wall 37 of the housing is formed with means for attaching the housing to a part of the vessel structure, such as the deck 38, and, in the construction disclosed, the bottom of the housing is provided with a continuous flange 39 extending downwardly from its outer edges, a part of flange 39 being a continuation of flange 14. Flange 39 may be secured to the deck in any convenient fashion and, initially, the flange is preferably of the same height throughout and is cut according to the sheer of the deck at the time of installation. The lower end of flange 39 may then be secured to the deck by welding, or a circumferential flange 40 extending laterally from flange 39 at its lower end in such position as to lie flat upon the deck may be secured to flange 39 by welding and then secured to the deck by bolts 41.

In putting the snubber together, the assembly of followers and spring groups is placed within the yoke in the proper relation and the assembly is compressed, until its length is slightly less than the distance between the inner faces of stops 11 and the rear end of the housing. The assembly is then held in compressed condition by wedges inserted between front follower 21 and the plates 31, 32, 33 at the forward end of the yoke. At this stage, the bolt 34 has not been inserted in the yoke and the forward end of the yoke is passed through the rear end of the housing until the front follower 21 engages stops 11. The cap 16 is next bolted in place, so that its flange 17 is in position to act as rear stops and bolt 34 is inserted through the plates. Upon application of a pulling force to the bolt, the assembly of followers and springs is shortened in length sufficiently to permit removal of the wedges. When the pulling force is released, the springs force the end followers into contact with the stops and the springs are under precompression, which is about equal to the force applied to a cable to be attached to the snubber to make a tight connection between two vessels, such a precompression load being ordinarily about 40,000 lbs.

When the snubber is in use, the cable indicated at 42 is looped about bolt 34 on opposite sides of the center plate 33 and about a rigid part of an adjacent vessel and the cable is taken up by the usual ratchet to make a tight connection. Since the precompression load on the springs of the snubber is equal to and, preferably, slightly greater than that normally applied to the cable to tauten the latter, the active portion of the snubber is initially rigid and unyielding and retains its full length. Whenever an excessive load is applied to the cable, the yoke is pulled outward relative to the housing and the springs further compressed, the load being absorbed equally by the two spring groups, since the groups are alike and the center follower is movable. The shortening of the length of the assembly of followers and springs relieves the strain on the cable and prevents its breaking and, when the excess load is removed, the active portion of the snubber resumes its original condition, so that the connection between the vessels remains tight and there is no slack in the cable.

When the snubber is to be used for connecting a pair of vessels end to end, one vessel is provided with a snubber at its bow and the other at its stern and cable is run from each snubber to a fixed part of the other vessel. When the snubber is to be used for making a connection between vessels lying side by side, the snubber is mounted so that the travel of its yoke is abeam rather than fore and aft.

The precompression applied to the spring groups in the snubber depends on the spacing between the stops formed by flanges 11 and portions 17a of the cap, and the maximum precompression is obtained when the flange 17 on the cap is secured to flange 14 on the housing with only a gasket 20 interposed between the flanges. When the snubber is to be used with cables under lighter loads and less precompression is desired, the spacing between the stops may be increased by interposing shims of proper thickness between the flanges 14 and 17.

I claim:

1. A towing snubber, which comprises a housing open at both ends, a recessed cap closing the rear end of the housing and providing a pair of internal stops adjacent said end of the housing, a pair of internal stops on the housing adjacent the front end thereof, front and rear end followers within the housing normally engaging the adjacent stops, a center follower within the housing, a pair of spring groups within the housing on opposite sides of the center follower, the spring groups each bearing against the center follower and the adjacent end follower and being under heavy compression, a yoke within the housing encircling the followers and spring groups and projecting out of the front end of the housing between the front stops, the rear end of the yoke engaging the outer face of the rear follower between the rear stops, means on the projecting end of the yoke for attachment of a cable thereto, and means on the housing for rigidly attaching the housing to a part of a vessel structure.

2. A towing snubber, which comprises a housing open at both ends, a cap closing the rear end of the housing, pairs of internal stops at opposite ends of the housing, front and rear end followers within the housing and normally engaging the adjacent stops, a center follower within the housing, a pair of spring groups within the housing on opposite sides of the center follower, the spring groups each bearing against the center follower and the adjacent end follower and being under heavy compression, a yoke within the housing encircling the followers and spring groups and projecting out of the front end of the housing between the front stops, the rear end of the yoke engaging the outer face of the rear follower between the rear stops, means on the projecting end of the yoke for attachment of a cable thereto, the interior length of the yoke being substantially greater than the distance between the outer faces of the end followers, and means on the housing for rigidly attaching the housing to a part of a vessel structure.

3. A towing snubber, which comprises a housing open at both ends, a recessed cap closing the rear end of the housing and providing a pair of internal stops adjacent said end of the housing, a pair of internal stops on the housing adjacent the front end thereof, front and rear end followers within the housing normally engaging the adjacent stops, a center follower within the housing, a pair of spring groups within the housing on opposite sides of the center follower, the spring groups each bearing against the center follower and the adjacent end follower and being under heavy compression, a yoke within the housing encircling the followers and spring groups and projecting out of the front end of the housing between the front stops, the rear end of the yoke engaging the outer face of the rear follower between the rear stops, the recess in the cap receiving the rear end of the yoke and permitting limited rearward movement of the yoke, means on the projecting end of the yoke for attachment of a cable thereto, and means on the housing for rigidly attaching the housing to a part of a vessel structure.

4. A towing snubber, which comprises a housing open at both ends, a cap closing the rear end of the housing, pairs of internal stops at opposite ends of the housing, front and rear end followers within the housing and normally engaging the adjacent stops, a center follower within the housing, a pair of spring groups within the housing on opposite sides of the center follower, the spring groups each bearing against the center follower and the adjacent end follower and being under heavy compression, a yoke within the housing encircling the followers and spring groups and including spaced longitudinal members projecting out of the front end of the housing between the front stops, the rear end of the yoke engaging the outer face of the rear follower, spaced end members connecting the projecting portions of the longitudinal members, the distance between the end members and the inner end of the yoke being substantially greater than the distance between the outer faces of the end followers in contact with the stops, and a bolt passing through aligned holes in the end members for attachment of a cable thereto.

5. A towing snubber, which comprises a housing open at both ends, a cap closing the rear end of the housing, pairs of internal stops at opposite ends of the housing, front and rear end followers within the housing and normally engaging the adjacent stops, spring means within the housing and engaging the opposed faces of the followers under heavy compression, a yoke within the housing encircling the followers and spring means and having longitudinal members projecting out of the front end of the housing between the front stops, the rear end of the yoke engaging the outer face of the rear follower, spaced end members connecting the projecting portions of the longitudinal members, and a bolt passing through aligned holes in the end members for attachment of a cable thereto, the housing having slotted side walls projecting forwardly beyond the front stops, the slots in the side walls receiving the ends of the bolt to permit rearward movement of the yoke.

6. A towing snubber, which comprises a housing open at both ends, a cap closing the rear end of the housing and formed with a recess opening into the housing, pairs of internal stops on the housing and cap assembly at opposite ends of the housing, front and rear followers within the housing in engagement with the respective pairs of stops, spring means within the housing between and engaging the followers and forcing them against the stops, a yoke within the housing encircling the followers and spring means, the yoke having a rear end engaging the rear follower and lying within the cap recess and including longitudinal members projecting out of the housing between the pair of front stops and a front end member connecting the projecting portions of the longitudinal members, the distance within the yoke between the rear and front end members thereof being greater than the distance between the outer faces of the followers in engagement with the stops, and means on the projecting portion of the yoke for attachment of a cable thereto.

7. A towing snubber, which comprises a housing open at both ends, a cap closing the rear end of the housing and formed with a recess opening into the housing, pairs of internal stops on the housing and cap assembly at opposite ends of the housing, front and rear followers within the housing in engagement with the respective pairs of stops, spring means within the housing between and engaging the followers and forcing them against the stops, a yoke within the housing encircling the followers and spring means, the yoke having a rear end engaging the rear follower and lying within the cap recess and including longitudinal members projecting out of the housing between the pair of front stops and a front end member connecting the projecting portions of the longitudinal members, the distance within the yoke between the rear and front end members thereof being greater than the distance between the outer faces of the followers in engagement with the stops, a pair of opposed side walls on the housing forward of the front stops, the side walls having longitudinal slots, and a bolt extending through an opening in the front end member of the yoke, the ends of the bolt lying within the slots in the side walls.

STANLEY H. FILLION.

References Cited in the file of this patent

UNITED STATES PATENTS

| Number | Name | Date |
| --- | --- | --- |
| 577,272 | Stretch | Feb. 16, 1897 |
| 987,312 | McKeen | Mar. 21, 1911 |
| 1,139,732 | Slick | May 18, 1915 |
| 1,412,737 | Hart | Apr. 11, 1922 |
| 1,593,761 | Endsley | July 27, 1926 |
| 1,813,078 | Nyrop | July 7, 1931 |
| 1,884,520 | Barrows | Oct. 25, 1932 |